United States Patent [19]

Crongeyer et al.

[11] 4,196,657

[45] Apr. 8, 1980

[54] VEHICLE VENT STRUCTURE

[76] Inventors: Robert G. Crongeyer, P.O. Box 1814, East Lansing, Mich. 48823; Jerry P. Crongeyer, 17206 Fairfield, Detroit, Mich. 48221

[21] Appl. No.: 939,395

[22] Filed: Sep. 5, 1978

[51] Int. Cl.² .............................................. B60H 1/26
[52] U.S. Cl. ...................................... 98/2.14; 52/200; 98/118; 296/137 B
[58] Field of Search ........................ 98/2.14, 114, 118; 296/137 R, 137 B; 52/199, 200; 285/189

[56] References Cited

U.S. PATENT DOCUMENTS

| | | | |
|---|---|---|---|
| 1,535,747 | 4/1925 | Stuckert | 52/200 |
| 2,610,593 | 9/1952 | Wasserman | 52/200 X |
| 3,003,601 | 10/1961 | Ott | 285/189 X |
| 3,065,572 | 11/1962 | Weingartner | 52/200 X |
| 3,434,250 | 3/1969 | Kiekhaefer | 52/200 X |
| 3,521,414 | 1/1970 | Malissa | 52/200 X |
| 3,587,443 | 6/1971 | Rapport | 98/114 |
| 3,749,908 | 7/1973 | Esser et al. | 52/200 X |

Primary Examiner—Albert J. Mara
Assistant Examiner—Harold Joyce
Attorney, Agent, or Firm—Fisher, Gerhardt, Crampton & Groh

[57] ABSTRACT

A mounting structure for vent systems on vehicles with metallic roof tops including a rigid frame adapted to be welded to the perimeter of an opening in the roof and projecting vertically above the surface of the roof to form a barrier to the passage of moisture. The frame is covered with a resilient frame, one portion of which acts as a seal between the rigid frame and the vent and the remainder of the resilient frame acts as a molding concealing the weld between the rigid frame and the roof of the vehicle. The rigid frame is provided with captive fastener elements which receive complementary fasteners for retaining a vent on the roof structure of the vehicle and at the same time permits easy removal of the vent in the absence of access to the interior of the vehicle.

4 Claims, 4 Drawing Figures

VEHICLE VENT STRUCTURE

This invention relates to hatches or vent structures for vehicles such as vans, trailers, motor coaches and the like and more particularly to a mounting arrangement for such vent structures.

A large variety of vents and skylights are available for the attachment to the existing metal roof structure of vehicles. Such vent units usually are installed after the vehicle has been purchased and sometimes only after the vehicle has been in use for some time. Such installation typically requires cutting a hole in the sheet metal roof of the vehicle and fastening the flange of the vent assembly to the sheet metal of the roof with screw fasteners. Though such installations are relatively simple, the multiplicity of screw fasteners tends to cause leakage into the interior of the vehicle. In addition, the vents are not easily replaced or interchanged with other vents. An additional problem of such arrangements is that the screw fasteners make the vents the subject of theft since they can be easily stripped from the exterior of the vehicle.

It is an object of the invention to provide a mounting arrangement for vehicle vents which inhibits leakage.

Another object of the invention is to provide a vehicle vent structure utilizing a standardized frame which is suitable to receive a large variety of vent assemblies.

Another object of the invention is to provide a mounting structure by which vents of different types can be mounted to facilitate replacement or exchange but at the same time inhibiting theft.

The objects of the invention are accomplished by a mounting structure for a vent system on vehicles with metallic roof tops wherein a frame is adapted to surround an opening in the roof and the frame has an L-shape cross section with a vertical flange portion welded at its lower end to the metallic roof top and a horizontal flange extending from an upper end of the vertical flange inwardly of frame. The frame is covered with a continuous resilient frame having a z-shaped cross section with horizontal flanges engaging, respectfully, the horizontal flange of the frame and the marginal portion of the roof adjacent to the opening. The horizontal flange of the resilient frame forms a seal between the vent structure and the horizontal flange of the rigid frame which acts as a seal to the passage of moisture. Also, the ridge vertical flange integral with the roof acts as a barrier to the passage of moisture. The underside of the horizontal flange is provided with rotatable fastening means adapted to receive threaded fasteners extending through the vent, the resilient frame and the rigid frame such that the vent may be removed or replaced but required access to the rotatable fastening means at the interior of the vehicle.

These and other objects of the invention will become apparent from the following description and from the drawing in which.

Figure 1:
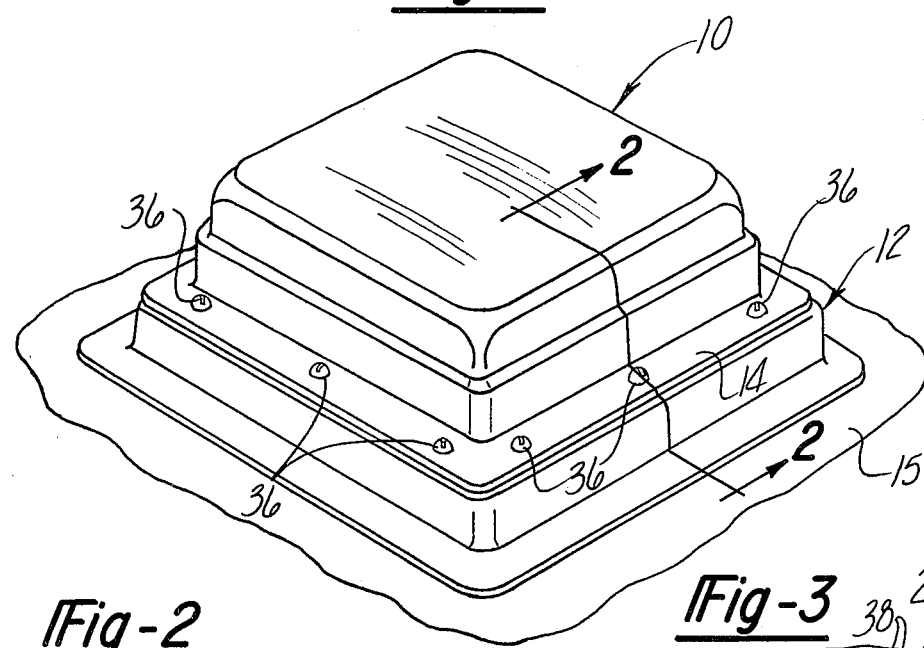
FIG. 1 is a perspective view of a vent and mounting structure embodying the invention in association with a metallic roof top of a vehicle.

Referring to the drawings and particularly to FIG. 1 a vent assembly 10 is shown in position on a mounting structure of the present invention and is designated generally at 12. The vent 10 can be any one of a large variety of vent assemblies which are available on the market. Such vents 10 are made of a variety of material, usually plastic, and are sometimes transparent or of translucent plastic material. Vents 10 may take various form but typically all include one form or another of a flange 14 which extends around the entire periphery of the vent. The flange 14 is to be fastened to the sheet metal panel 15 forming the roof of a vehicle by means of screw fasteners such as sheet metal screws or bolts.

Figure 2:
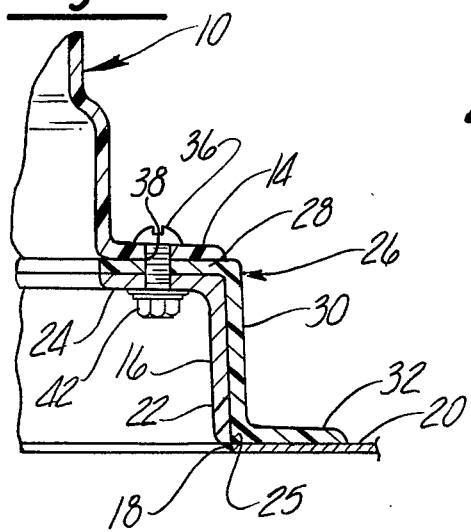
FIG. 2 is a cross sectional view taken generally on line 2—2 in FIG. 1.
Figure 3:
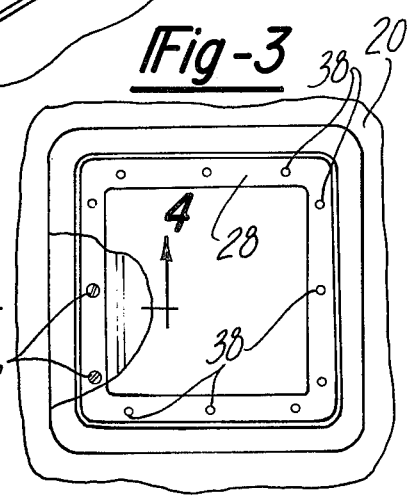
FIG. 3 is a top plan view of the mounting structure with the vent removed.

As seen in FIG. 2, the mounting structure 12 includes a frame 16 which is made of angle iron and is of rectilinear form, usually a square. The frame 16 surrounds the edge 18 of an opening in the sheet metal of the vehicle body.

The frame 16 has a generally L-shaped cross section with a vertical leg member 22, the lower end of which is welded continuously around the entire perimeter of the frame adjacent the edge 18. The upper end of the vertical leg has a horizontal leg 24 which extends inwardly of the opening as defined by the edge 18. The welding bead indicated at 25 extends continuously around the entire perimeter of the frame and forms a unitary structure with the vehicle roof panel 15 which prevents air or water leakage.

The welding bead 25 is concealed by a molded plastic frame 26 which as seen in FIG. 2 has a generally z-shaped cross section with a horizontal portion 28 covering the horizontal leg 24 of the frame 16. A vertical portion 30 and horizontal portion 32 cover the vertical leg 22 of the frame and the marginal portion of the roof 20 adjacent the edge 18 of the opening. The portions 30 and 32 act as a molding to conceal the weld bead 25 and portion 28 acts as a gasket or seal between the horizontal leg 24 of the frame and the flange 14 of the vent 10. For this purpose it is preferable that the plastic frame 26 is made of soft, flexible plastic so that it will distort slightly under load to enhance the sealing between the flange 14 and horizontal 24.

Figure 4:
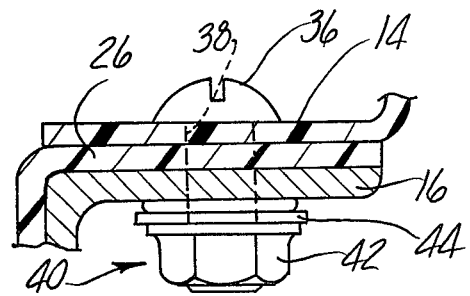
FIG. 4 is a cross sectional view at an enlarged scale taken generally on line 4—4 in FIG. 3.

The vent assembly 10 is held in position by screw fasteners such as bolts 36, three of which are associated with each side of the vent. The bolts 36 pass through aligned openings 38 in flange 14, horizontal portion 28 of the plastic frame and the horizontal leg 24 of the frame 16. The threaded ends of the bolts 36 are received in nut assemblies 40 which are held captive on the underside of the vertical leg 22 of the frame 14 as best seen in FIG. 4.

The nut assemblies 40 include a threaded nut 42 rotatably mounted relative to a support flange 44 which is adapted to be rigidly connected to the frame by welding or the like. The nut 42 is free to rotate relative to the stationary flange 44 to receive the threaded end of the bolts 36. Typically a nut is provided for each of the flange openings 38 although it will be understood that additional nut assemblies 40 and openings 38 may be provided having different spacings and orientation to accept vents having slightly different fastener spacing.

The captive nut assemblies 40 permit the vent assembly 10 to be mounted on the mounting structure 12 in a detachable manner facilitating replacement or exchange for another type of vent but at the same time makes it difficult if not impossible to remove the vent without having access to the interior of the vehicle. To remove the vent it is necessary to have the assistance of someone positioned within the vehicle or to provide means for holding a wrench in position within the vehicle to resist turning of the nut 42 while the bolts are removed from the exterior of the vehicle. As a result, theft of vents mounted in accordance with the present invention is prevented.

Installation of the mounting structure 12 and the roof panel of a vehicle is accomplished by placing the frame 16 in the desired position on the vehicle and marking the position of the vertical leg or flange 22. Cutting of the roof panel 15 along the outlined mark and removal of the outlined metal forms an opening. Thereafter the lower edge of the vertical flange 22 is welded to the edge 18 of the opening as indicated in FIG. 2 at 25. This serves to make the frame integral with the roof. Thereafter the frame 14 and the marginal edges adjacent the edges 18 are covered with the plastic frame 26. A vent assembly is placed on the horizontal portion 28 of the plastic frame 26 and fasteners 36 are used to hold the vent in position with the horizontal portion 28 acting as a seal. Installation is made by having someone or some means within the interior of the vehicle to hold the nuts 42 against rotation. Similarly, when it is desired to replace or substitute another vent for the existing vent panel, means must be provided in the interior of the vehicle to hold the nuts 42 against rotation during rotational movement of the bolt or stud 36.

A mounting structure for vent assemblies and a method of installation on a vehicle has been provided wherein a frame is adapted to surround an opening in the roof top and to be formed integrally with the original roof to present a vertical barrier against the passage of air or moisture. The top of the frame forms a horizontal mounting surface which receives the typical flange on a vent structure with a seal member sandwiched between to prevent air and water leakage. The vent is held in position by a plurality of threaded fasteners which are received in nuts axially fixed but rotatably mounted on the underside of the flange of the frame so that removal of the vent structure is prevented unless access is available to the interior of the vehicle.

The embodiments of the invention in which an exclusive property or privilege is claimed are defined as follows:

1. A mounting structure for vent systems on vehicles having metallic roof tops comprising; a frame adapted to surround an opening in said roof top, said frame having an L-shaped cross section including a vertical flange having a lower edge adapted to be continuously welded to said metallic roof top, a horizontal flange extending from an upper edge of said vertical flange and extending inwardly of said frame, and fastening means disposed in selected locations at the other side of said horizontal flange to receive and retain threaded fasteners extending from said vent system and through said frame, seal means disposed between said vent system and said frame and being clamped therebetween by said fastening means to provide a weather tight seal, said seal means being formed by a flexible molding member covering the exterior of said first mentioned frame and a marginal area of the roof top adjacent said frame.

2. The combination of claim 1 wherein said fastening means are threaded nut elements supported in permanently attached, rotatable relation at the underside of said frame.

3. The combination of claim 1 and further comprising a molding member having a z-shaped cross section surrounding said frame and being disposed in engagement with said horizontal and vertical flanges of said frame and being adapted to engage a portion of said roof top adjacent to said frame.

4. A mounting structure for vent assemblies on vehicle bodies to cover openings in metallic roof tops comprising; a frame adapted to surround an opening in said roof top, said frame having an L-shaped cross section including a vertical flange having a lower end adapted to be continuously welded to a metallic roof top, a horizontal flange extending from an upper edge of said vertical flange and extending inwardly of said frame, a molding member having a z-shaped cross section surrounding said frame and being in engagement with said horizontal and vertical flanges and being engageable with a portion of said roof top adjacent said frame, a vent assembly for covering said opening having a mounting flange complementary to the portion of said molding member on said horizontal flange said portion of said molding member on said horizontal flange forming a flexible seal, and fastening means joining said vent assembly and frame together, said fastening means including bolts passing through said vent assembly, said flexible seal and frame and being threadably received in rotatable nuts, said nuts being supported on said frame for rotation in axially fixed position independently of said bolts.

* * * * *